United States Patent
Gupta et al.

(10) Patent No.: US 7,994,102 B2
(45) Date of Patent: Aug. 9, 2011

(54) METHOD OF TREATING AN ALLOY SURFACE WITH AN ALKYL SARCOSINATE

(75) Inventors: D V Satyanarayana Gupta, The Woodlands, TX (US); Joel Lynn Boles, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 458 days.

(21) Appl. No.: 12/060,335

(22) Filed: Apr. 1, 2008

(65) Prior Publication Data

US 2009/0247431 A1 Oct. 1, 2009

(51) Int. Cl.
*C09K 8/86* (2006.01)

(52) U.S. Cl. .......... 507/244; 507/90; 507/237; 507/247; 507/255; 507/267; 507/269; 166/305.1; 166/306; 166/311

(58) Field of Classification Search .................. None
See application file for complete search history.

(56) References Cited

U.S. PATENT DOCUMENTS

| | | | | |
|---|---|---|---|---|
| 3,627,043 | A * | 12/1971 | Brown | 166/325 |
| 3,743,019 | A * | 7/1973 | Totty | 166/276 |
| 3,908,759 | A * | 9/1975 | Cagle et al. | 166/117.6 |
| 4,616,719 | A * | 10/1986 | Dismukes | 175/94 |
| 4,710,074 | A * | 12/1987 | Springer | 408/200 |
| 4,834,184 | A * | 5/1989 | Streich et al. | 166/376 |
| 5,018,577 | A * | 5/1991 | Pardue et al. | 166/279 |
| 5,139,701 | A | 8/1992 | McDonald | |
| 6,071,434 | A * | 6/2000 | Davis et al. | 252/389.2 |
| 7,326,670 | B2 | 2/2008 | DiLullo et al. | |
| 7,413,013 | B2 * | 8/2008 | Welton et al. | 166/279 |
| 2003/0150613 | A1* | 8/2003 | Freiter | 166/279 |
| 2006/0166835 | A1* | 7/2006 | Yang et al. | 507/200 |
| 2007/0079963 | A1* | 4/2007 | Yang et al. | 166/270 |

* cited by examiner

*Primary Examiner* — John J Figueroa
(74) *Attorney, Agent, or Firm* — John Wilson Jones; Jones & Smith, LLP

(57) ABSTRACT

An acid treatment composition is provided including a corrosion inhibitor and an optional corrosion inhibitor intensifier in an acidic solution. More specifically, the composition includes an anionic surfactant. Methods for treating wells with these acid treatment compositions are also provided that help control corrosion of the steel used in the wells during the acid treatment.

11 Claims, No Drawings

METHOD OF TREATING AN ALLOY SURFACE WITH AN ALKYL SARCOSINATE

BACKGROUND OF THE INVENTION

1. Field of the Invention

The present invention relates generally to the reduction of corrosion of metal alloys used during acidizing treatments of wells.

2. Description of the Related Art

Aqueous acidic solutions are frequently applied to treat wells and to remove formation damage during well completions or subsequent workovers. Acid treatment of a well involves the pumping downhole of an aqueous acidic solution that reacts with the subterranean formations, such formations usually consisting of limestone or sand, to increase the size of the pores within the formations and provide enlarged passageways for hydrocarbon, water, or steam to more freely move to collection points that would otherwise be obstructed. Depending on the types of treatments and the nature of formation damage, the aqueous acidic solutions can be hydrochloric acid (HCl), hydrochloric-hydrofluoric mud acid (HCl—HF), organic acids such as acetic acid and formic acid, or combinations thereof. A problem associated with acid treatments is the corrosion by the acidic solution of the metal tubular goods in the wellbore and the other equipment used to carry out the treatment. The corrosion problem is exacerbated by the elevated temperatures and pressures encountered in deeper formations. In the wellbore, the tubular materials used are normally carbon steel or alloy steel. The cost of repairing or replacing corrosion-damaged casing, tubing, and other equipment in the wellbore is extremely high.

Various acid compositions that include corrosion inhibitors for diminishing the corrosive effects of the acid on metal surfaces have been developed and used previously. The types of components employed in corrosion inhibitors vary depending upon the nature of the compositions, the types of metal surfaces involved, associated environmental conditions, and so forth. In some prior attempts to reduce corrosion by using corrosion inhibitors, various problems exist, such as having high toxicity ratings or not being environmentally friendly. Some prior art corrosion inhibitors are also cationic, which makes them incompatible with various other acid treatment additives, such as with anionic anti-sludge agents.

A need exists for new and useful compositions for inhibiting or preventing corrosion during the acid treatments of wells with safer, less toxic, and more environmentally acceptable acid treatment fluid compositions. It is also desirable for the compositions to be compatible with other additives that are used in acid treatments.

SUMMARY OF THE INVENTION

In view of the foregoing, methods and compositions of reducing corrosion of alloy surfaces in various treatment applications are provided as embodiments of the present invention. In an embodiment, a method of treating an alloy surface is provided that results in a reduction in corrosion of the alloy surface compared with only contacting the alloy surface with the aqueous acidic fluid. In this method, the alloy surface is contacted with a treatment fluid comprising an aqueous acidic fluid and a corrosion inhibitor comprising an anionic surfactant so that a reduction in corrosion of the alloy surface occurs compared with only contacting the alloy surface with the aqueous acidic fluid.

As another embodiment of the present invention, a method of inhibiting corrosion of a steel surface in contact with an acidic fluid is provided. In this embodiment, the acidic fluid is contacted with a corrosion inhibitor comprising a compound having the following formula:

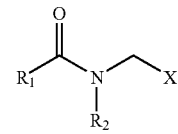

wherein $R_1$ is a hydrophobic group having about 12 to about 24 carbon atoms; $R_2$ is hydrogen, methyl, ethyl, propyl, or butyl; and X is carboxyl or sulfonyl. The steel surface is then contacted with the acidic fluid and the corrosion inhibitor. Again, corrosion is reduced, particularly when compared with contacting the steel surface with the acidic fluid without use of the corrosion inhibitor.

Besides the method embodiments, compositions are also provided as embodiments of the present invention. In an embodiment, a composition for use in the acid treatment of wells is provided. In an aspect, the composition includes a corrosion inhibitor in an acidic solution. The corrosion inhibitor can include an anionic surfactant comprising an alkyl sarcosinate in an acidic solution comprising hydrochloric acid, hydrochloric-hydrofluoric acid, acetic acid, formic acid, citric acid, phosphonic acid, methanesulfonic acid, or combinations thereof. In an aspect, the composition can also include a corrosion inhibitor intensifier that includes formic acid, sodium formate, potassium formate, methylformate, ethylformate, sodium iodide, potassium iodide, copper iodide, molecular iodide, metal oxides, or combinations thereof.

DEFINITIONS

The following definitions are provided in order to aid those skilled in the art in understanding the detailed description of the present invention.

The term "anionic" refers to those surfactants that possess a net negative charge.

The term "fracturing" refers to the process and methods of breaking down a geological formation, i.e. the rock formation around a well bore, by pumping fluid at very high pressures, in order to increase production rates from a hydrocarbon reservoir. The fracturing methods of this invention use otherwise conventional techniques known in the art.

The term "surfactant" refers to a soluble or partially soluble compound that reduces the surface tension of liquids, or reduces inter-facial tension between two liquids, or a liquid and a solid by congregating and orienting itself at these interfaces.

DESCRIPTION OF ILLUSTRATIVE EMBODIMENTS

Illustrative embodiments of the invention are described below as they might be employed in the operation and in the treatment of well bores. In the interest of clarity, not all features of an actual implementation are described in this specification. It will of course be appreciated that in the development of any such actual embodiment, numerous implementation-specific decisions must be made to achieve the developers' specific goals, which will vary from one implementation to another. Moreover, it will be appreciated that such a development effort might be complex and timeconsuming, but would nevertheless be a routine undertaking for those of ordinary skill in the art having the benefit of this disclosure. Further aspects and advantages of the various embodiments of the invention will become apparent from consideration of the following description.

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

Methods and compositions of reducing corrosion of alloy surfaces in various treatment applications are provided as embodiments of the present invention. In an embodiment, a method of treating an alloy surface is provided that results in a reduction in corrosion of the alloy surface when compared with only contacting the alloy surface with the aqueous acidic fluid. In this method, the alloy surface is contacted with a treatment fluid comprising an aqueous acidic fluid and a corrosion inhibitor comprising an anionic surfactant so that a reduction in corrosion of the alloy surface occurs compared with only contacting the alloy surface with the aqueous acidic fluid.

In an aspect, the surfactant is anionic. The anionic surfactant can be an alkyl sarcosinate. The alkyl sarcosinate can generally have any number of carbon atoms. In an aspect, the alkyl sarcosinates have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms.

The anionic surfactant can have the chemical formula $R_1CON(R_2)CH_2X$, wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

Sarcosine (N-methylglycine) is a naturally occurring amino acid found in starfish, sea urchins, and crustaceans. It can be purchased from a variety of commercial sources, or alternatively, produced by a number of synthetic means known in the art including thermal decomposition of caffeine in the presence of barium hydroxide (*Arch. Pharm.* 232: 601, 1894); (*Bull. Chem. Soc. Japan,* 39: 2535, 1966); and numerous others (T. Shirai in Synthetic Production and Utilization of Amino Acids; T. Kaneko, et al., Eds.; Wiley, New York: pp. 184-186, 1974). Sodium sarcosinate is manufactured commercially from formaldehyde, sodium cyanide and methyl amine (as described in U.S. Pat. Nos. 2,720,540 and 3,009,954). In an aspect, one suitable sarcosinate useful in the present invention includes the condensation products of sodium sarcosinate and a fatty acid chloride. The fatty acid chloride is reacted with sodium sarcosinate under carefully controlled alkaline conditions (i.e. the Schotten-Bauman reaction) to produce the fatty sarcosinate sodium salt that is water soluble. Upon acidification, the fatty sarcosine acid, which is also water insoluble, is formed and can be isolated from the reaction medium. The acyl sarcosines can be neutralized with bases such as the salts of sodium, potassium, ammonia, or organic bases such as triethanolamine in order to produce aqueous solutions. In an aspect, the sarcosinates of the present invention can be represented structurally as:

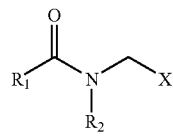

wherein $R_1$ is a hydrophobic moiety of alkyl, alkenyl, alkylarylalkyl, alkoxyalkyl, and the like, wherein alkyl and alkenyl represent groups that contain about 12 to about 24 carbon atoms that can be branched or straight chained. Representative long chain alkyl groups include, but are not limited to, tetradecyl, hexadecyl, octadecentyl (oleyl), octadecyl (stearyl), and docosenoic functionalities. $R_2$ is hydrogen, methyl, propyl, butyl, or ethyl. X is carboxyl or sulfonyl.

One suitable surfactant selected for use in the method of the invention is an anionic sarcosinate surfactant available commercially from BJ Services Company as "M-Aquatrol" (MA). The MA-1 sarcosinate is a viscous liquid surfactant with at least 94% oleoyl sarcosine.

The surfactant can generally be present in any weight percent concentration. In an aspect, the concentrations of the anionic surfactant range from about 0.1 vol. % to about 15 vol. %; alternatively, from about 0.1 vol. % to about 10 vol. %; or alternatively, from about 0.5 vol. % to about 6 vol. %. Laboratory procedures can be used to determine the optimum concentrations for any particular application. The corrosion inhibitors reduce corrosion rates of the alloy surface to less than about 0.05 lb/ft$^2$ when using the methods and compositions of the present invention.

The surfactant can be added to an aqueous solution in which there is typically dissolved a quantity of at least one water soluble salt to affect formation stability. Typical water-soluble salts include potassium chloride, sodium chloride and the like. Formation stability is typically achieved with only small concentrations of salt.

In an aspect, the surfactant can include sodium salts of $C_6$-$C_{30}$ fatty acyl sarcosinates, such as sodium lauroyl sarcosinate (e.g., HAMPOSYL L-30 from Hampshire Chemical); $C_6$-$C_{30}$ fatty acyl esters of sarcosine acid, such as lauroyl sarcosine (e.g., HAMPOSYL L from Hampshire Chemical); oleoyl sarcosine (e.g., HAMPOSYL 0 from Hampshire Chemical); or combinations thereof.

The methods and compositions described herein can be used in a wide variety of temperatures. In an aspect, for example, the corrosion inhibitor comprising an anionic surfactant compound can be used in temperatures of up to about 180° F. For temperatures above 180° F., a corrosion inhibitor intensifier can be used to increase the corrosion prevention strength of the corrosion inhibitor. For temperatures that range from about 180° F. to about 350° F., the treatment fluid comprises the corrosion inhibitor and the corrosion inhibitor intensifier. The methods and compositions comprising both the corrosion inhibitor and the corrosion inhibitor intensifier are suitable for applications of up to about 350° F.

When the corrosion inhibitor intensifier is added to the composition, the composition can comprise about 2 pounds per thousand gallons (pptg) to about 100 pptg corrosion inhibitor intensifier; or alternatively, from about 5 pptg to about 35 pptg. In an aspect, when a liquid corrosion inhibitor intensifier is added to the composition, the composition can comprise about 2 gallon per thousand gallons (gpt) to about 100 gpt; alternatively, from about 5 gpt to about 30 gpt; or alternatively, from about 5 gpt to about 10 gpt. When the corrosion inhibitor intensifier is used, it can be present in a range of about 0.05 wt. % to about 25 wt. %; or alternatively, from about 0.1 wt. % to about 20 wt. %. The corrosion inhibitor and corrosion inhibitor intensifier reduce corrosion rates of the alloy surface to less than about 0.050 lb/ft² during the step of contacting the alloy surface with the treatment fluid at temperatures of up to about 350° F. In applications greater than 180° F., the corrosion inhibitor works better with the corrosion inhibitor intensifier being added.

The amounts of various other components can also be varied in the present invention. For example, the amount of acid that can be used in the acid treatment varies, as will be apparent to those of skill in the art. Various amounts of acids contained within the compositions described herein can be used in the present invention. In an aspect, the composition can comprise from about 1 wt. % to about 50 wt. % acid in the acidic fluid; alternatively, from about 3 wt. % to about 30 wt. % acid in the acidic fluid; or alternatively, about 15 wt. % acid in the acidic fluid.

Because the corrosion inhibitor is anionic, it is compatible with various other anionic and nonionic surfactants. By combining the corrosion inhibitor of the present invention with various other surfactants, it is possible to simultaneously reduce corrosion on alloy surfaces and also take advantage of the synergistic effects of combining the sarcosinate surfactant with other types of surfactants. In an aspect, the treatment fluid further comprises at least one additional corrosion inhibitor. The at least one additional corrosion inhibitor can be nonionic, anionic, or combinations thereof. Additional corrosion inhibitors can be considered to be co-inhibitors with the corrosion inhibitors of the present invention. Such additional corrosion inhibitors can include arsenic, condensation amines, acetylenic alcohols, and combinations thereof. Other suitable additional corrosion inhibitors will be apparent to those of skill in the art and are to be considered within the scope of the present invention.

Corrosion is a problem for many types of alloy surfaces that are exposed to aqueous acidic solutions. The methods and compositions described herein are useful in reducing corrosion rates of various types of alloy surfaces. For example, the alloy surface can include alloys of steel, alloys of nickel, coiled tubing, corrosion resistant alloys, or duplex steels. Alloys of steel can include stainless steel, carbon steel, and the like. Corrosion resistant alloys can include chromium and the like. Other suitable types of alloy surfaces that the methods and compositions described herein can be used on will be apparent to those of skill in the art and are to be considered within the scope of the present invention.

The methods and compositions described herein can be used for various types of treatments for applications that occur in or before the wellbore and in subterranean formation applications. For example, the methods and compositions of the present invention can be used in the wellbore applications or before the wellbore applications that include pickling a tubular, cleaning a wellbore, scale treatment, and coiled tubing applications. As another example, the method of treating a subterranean formation can include matrix acid stimulation, acid fracturing, acid tunneling, drilling mud removal, scale treatment, coiled tubing application, or damage removal. Regardless of the type of application, a goal of the present invention is to protect metal tubulars or alloy surfaces from the acidic fluids that are introduced into the metal tubulars or coiled tubing. Other types of treatment applications that the methods and compositions described herein can be used will be apparent to those of skill in the art and are to be considered within the scope of the present invention.

During various treatments for applications that occur before or in the wellbore and subterranean formation applications, various types of acids can be used in the aqueous acidic fluids. The methods and compositions described herein can be used with various types of aqueous acidic fluids. For example, the aqueous acidic fluid can include hydrochloric acid, hydrochloric-hydrofluoric acid, acetic acid, formic acid, citric acid, phosphonic acid, methanesulfonic acid, or combinations thereof. Other types of acids that can be used in the aqueous acidic fluids of the present invention will be apparent to those of skill in the art and are to be considered within the scope of the present invention.

The methods and compositions described herein are useful in reducing corrosion rates of metal alloy surfaces. In an aspect, the corrosion inhibitor and corrosion inhibitor intensifier reduce corrosion rates of the alloy surface to less than about 0.050 lb/ft² for regular tubular or 0.02 lb/ft² for coiled tubing during the step of contacting the alloy surface with the treatment fluid. The methods and compositions described herein are also useful in temperatures of up to about 350° F.

As another embodiment of the present invention, a method of inhibiting corrosion of a steel surface in contact with an acidic fluid is provided. In this embodiment, the acidic fluid is contacted with a corrosion inhibitor comprising a compound having a formula:

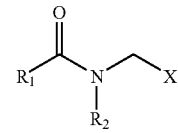

wherein $R_1$ is a hydrophobic change having about 12 to about 24 carbon atoms; $R_2$ is hydrogen, methyl, ethyl, propyl, or butyl; and X is carboxyl or sulfonyl. The steel surface is then contacted with the acidic fluid and the corrosion inhibitor. Again, corrosion is reduced, particularly when compared with contacting the steel surface with the acidic fluid without use of the corrosion inhibitor.

As described previously, in an aspect, the acidic fluid can also be contacted with a corrosion inhibitor intensifier along with the corrosion inhibitor, the corrosion inhibitor intensifier comprising formic acid, sodium formate, potassium formate, methylformate, ethylformate, sodium iodide, potassium iodide, copper iodide, molecular iodide, metal oxides, or combinations thereof. The corrosion inhibitor intensifier is particularly useful in applications having a temperature of greater than about 180° F.

Besides the method embodiments, compositions are also provided as embodiments of the present invention. In this embodiment, a composition for use in the acid treatment of wells is provided. In this embodiment, the composition includes a corrosion inhibitor in an acidic solution. In an aspect, the corrosion inhibitor includes an anionic surfactant comprising an alkyl sarcosinate in an acidic solution comprising hydrochloric acid, hydrochloric-hydrofluoric acid, acetic acid, formic acid, citric acid, phosphonic acid, methanesulfonic acid, and combinations thereof. In an aspect, the composition can also include a corrosion inhibitor intensifier that includes formic acid, sodium formate, potassium formate, methylformate, ethylformate, sodium iodide, potassium iodide, copper iodide, molecular iodide, metal oxides, or combinations thereof.

In embodiments of the present invention, the corrosion inhibitor intensifier can be used to help bolster the corrosion prevention power of the corrosion inhibitor on its own, particularly at elevated temperatures. In an aspect, when the corrosion inhibitor intensifier is used, the corrosion inhibitor intensifier can include formic acid, sodium formate, potassium formate, methylformate, ethylformate, sodium iodide, potassium iodide, copper iodide, molecular iodide, metal oxides, or combinations thereof. Other suitable corrosion inhibitor intensifiers will be apparent to those of skill in the art and are to be considered within the scope of the present invention.

As an advantage of the present invention, the methods and compositions described herein are compatible with various additives that are typically used in treatments and also may reduce or eliminate the need for some of the other additives. For example, because the corrosion inhibitor of the present invention includes a surfactant, traditional surfactants may not be needed in various applications. The corrosion inhibitor comprising the surfactant may sufficiently lower surface tension so that additional surfactants are not needed. As another example, the compositions and methods of the present invention may convey some of the same benefits of anti-sludge additives, but without the added expense of adding a separate anti-sludge additive. The compositions and methods of the present invention are compatible with many typical anti-sludge additives, such as sodium dodecyl sulfate, which has historically been a problem with cationic corrosion inhibitors.

As another benefit of the present invention, the methods and compositions described herein leave the formation water-wet, which aids in efficient hydrocarbon transport within the sandstone formation. When formations are left water-wet, a smaller differential pressure is needed to recover hydrocarbons from the well. Many prior art corrosion inhibitors are cationic, which tend to leave the formation oil-wet.

EXAMPLES

The following examples are included to demonstrate the use of compositions in accordance with embodiments of the present invention. It should be appreciated by those of skill in the art that the techniques disclosed in the examples that follow represent techniques discovered by the inventors to function well in the practice of the invention. However, those of skill in the art should, in light of the present disclosure, appreciate that many changes can be made in the specific embodiments that are disclosed and still obtain a like or similar result without departing from the scope of the invention.

Example 1

Corrosion tests were performed at 150° F. (65° C.) under atmospheric pressure on 4"×4" carbon steel (N80) coupons in an agitated water bath. Each metal test coupon was blasted with glass beads before and after the corrosion test to ensure a uniform and clean surface. After the coupons were cleaned and dried, they were weighed before and after the water bath in order to determine the corrosion rate during the test. A 15 wt. % hydrochloric acid solution was applied to the carbon steel for six hours. One comparison run was performed at 150° F. (Sample No. 1 in Table 1) where only the aqueous acidic fluid was used, without any corrosion inhibitor. The surfaces of the test coupons were examined under a microscope for pitting. The results of the corrosion tests are shown in Table 1. The pitting was evaluated using the following pitting scale, which is used for all of the examples described herein:

0=no pitting, staining or surface irregularities;
0–trace=slight staining of surface, but no surface irregularities; trace=a trace amount of pitting on surface;
1=slightly more than a trace amount of pitting on surface;
2=a small amount of pitting on the surface;
3=a medium amount of pitting on the surface;
4=a large amount of pitting on the surface; and
5=large holes or very deep pits anywhere on the test coupon.

As demonstrated in Table 1, by applying the compositions and using the methods described herein, corrosion of carbon steel in aqueous acidic solutions can be controlled. The results in Table 1 demonstrate the effectiveness of the corrosion inhibitors in the current invention. The industry generally acceptable level for corrosion rates is less than 0.050 lb/ft² during the life of treatment, i.e., acid contact time, for metal tubulars. As shown in Table 1, all of the samples that used the corrosion inhibitor performed substantially better than the sample without any corrosion inhibitor and also substantially better than the generally accepted industry standard of less than 0.050 lb/ft² for regular tubulars.

TABLE 1

6-hour Acid Corrosion Tests at 150° F.

| Sample No. | Inhibitor | Conc. (wt. %) | Initial Wt., gr | Final Wt., gr | Corrosion Rate, lb/ft² | Pitting |
|---|---|---|---|---|---|---|
| 1 | None | 0 | 41.7503 | 40.6202 | 0.0870 | 0-1 |
| 2 | Hamposyl C | 1 | 41.5623 | 41.2755 | 0.0221 | 0 |
| 3 | Hamposyl L | 1 | 41.5926 | 41.3675 | 0.0173 | 0 |
| 4 | Hamposyl O | 1 | 41.0341 | 40.8515 | 0.0141 | 0 |

Example 2

Corrosion tests were performed at 180° F. (82.2° C.) under atmospheric pressure on 4"×4" carbon steel (N80) coupons in an agitated water bath. Each metal test coupon was blasted with glass beads before and after the corrosion test to ensure a uniform and clean surface. After the coupons were cleaned and dried, they were weighed before and after the water bath in order to determine the corrosion rate during the test. A 15 wt. % hydrochloric acid solution was applied to the carbon steel for six hours. One comparison run was performed at 150° F. (Sample No. 1 in Table 2) where only the aqueous acidic fluid was used, without any corrosion inhibitor. The surfaces of the test coupons were examined under a microscope for pitting. The same pitting scale described in Example 1 was used in Example 2. The results of the corrosion tests for Example 2 are shown in Table 2.

TABLE 2

| Sample No. | Inhibitor | Conc. (wt. %) | Intensifier | Amount (lb/1000 gal) | Initial Wt., gr | Final Wt., gr | Corrosion Rate, lb/ft² | Pitting |
|---|---|---|---|---|---|---|---|---|
| 1 | None | 0 | None | 0 | 43.2253 | 39.9118 | 0.2174 | 1 |
| 2 | Hamposyl C | 1 | None | 0 | 41.5977 | 39.1996 | 0.1573 | 1 |
| 3 | Hamposyl L | 1 | None | 0 | 41.2801 | 40.6804 | 0.0393 | 1 |
| 4 | Hamposyl O | 1 | None | 0 | 41.5942 | 40.0010 | 0.1045 | 1 |

TABLE 2-continued

| Sample No. | Inhibitor | Conc. (wt. %) | Intensifier | Amount (lb/1000 gal) | Initial Wt., gr | Final Wt., gr | Corrosion Rate, lb/ft² | Pitting |
|---|---|---|---|---|---|---|---|---|
| 5 | Hamposyl C | 1 | KI | 10 | 41.4378 | 40.9383 | 0.0328 | 0-1 |
| 6 | Hamposyl L | 1 | KI | 10 | 42.7627 | 42.3779 | 0.0252 | 1-2 |
| 7 | Hamposyl O | 1 | KI | 10 | 40.2278 | 39.7086 | 0.0341 | 0-1 |

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the methods described herein without departing from the concept, spirit and scope of the invention. More specifically, it will be apparent that certain agents that are chemically related can be substituted for the agents described herein while the same or similar results would be achieved. All such similar substitutes and modifications apparent to those skilled in the art are deemed to be within the scope and concept of the invention.

What is claimed is:

1. A method of treating an alloy surface in a wellbore treatment application comprising the step of contacting the alloy surface with a treatment fluid comprising an aqueous acidic fluid and a corrosion inhibitor comprising an alkyl sarcosinate so that a reduction in corrosion of the alloy surface occurs compared with only contacting the alloy surface with the aqueous acidic fluid, wherein (i) the corrosion inhibitor is present in a range of about 0.10 vol. % to about 10 vol. %, (ii) the corrosion inhibitor reduces corrosion rates of the alloy surface to less than about 0.050 lb/ft², (iii) the acid of the aqueous acidic fluid is selected from the group consisting of hydrochloric acid, hydrochloric-hydrofluoric acid, acetic acid, formic acid, citric acid, phosphonic acid, methanesulfonic acid and combinations thereof, and (iv) the alloy surface is present in an application comprising pickling a tubular, cleaning a wellbore, matrix acid stimulation, acid fracturing, acid tunneling, drilling mud removal, coiled tubing application, or damage removal.

2. The method of claim 1, wherein the alkyl sarcosinate has from about 12 to about 24 carbon atoms.

3. The method of claim 1, wherein the alloy surface comprises alloys of steel, alloys of nickel, coiled tubing, corrosion resistant alloys, or duplex steels.

4. The method of claim 1, wherein the acid of the aqueous acidic fluid is selected from the group consisting of hydrochloric acid, hydrochloric-hydrofluoric acid, acetic acid, formic acid and citric acid, or combinations thereof.

5. The method of claim 1, wherein the treatment fluid further comprises a corrosion inhibitor intensifier.

6. The method of claim 5, wherein the corrosion inhibitor intensifier is selected from the group consisting of formic acid, sodium formate, potassium formate, methylformate, ethylformate, sodium iodide, potassium iodide, copper iodide, molecular iodide, metal oxides and combinations thereof.

7. The method of claim 5, wherein the corrosion inhibitor intensifier is in a range of about 2 gpt to about 100 gpt.

8. A method of inhibiting corrosion of a steel surface in contact with an acidic fluid in a wellbore treatment application comprising the steps of:
a. combining the acidic fluid with between from about 0.10 vol. % to about 10 vol. % of a corrosion inhibitor, the corrosion inhibitor being an anionic surfactant comprising an alkyl sarcosinate of the formula

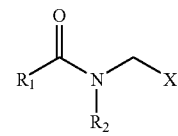

wherein:
R₁ is a hydrophobic change having about 12 to about 24 carbon atoms;
R₂ is hydrogen, methyl, ethyl, propyl, or butyl; and
X is carboxyl or sulfonyl; and
b. contacting the steel surface with the acidic fluid and the corrosion inhibitor and further wherein the acid of the aqueous acidic fluid is selected from the group consisting of hydrochloric acid, hydrochloric-hydrofluoric acid, acetic acid, formic acid, citric acid, phosphonic acid, methanesulfonic acid, or combinations thereof.

9. The method of claim 8, wherein the steel surface comprises alloys of steel, alloys of nickel, coiled tubing, corrosion resistant alloys, or duplex steels.

10. The method of claim 8, wherein the acid of the acidic fluid is selected from the group consisting of hydrochloric acid, hydrochloric-hydrofluoric acid, acetic acid, formic acid, citric acid, and methanesulfonic acid, and combinations thereof.

11. The method of claim 8, wherein the acidic fluid is also contacted with a corrosion inhibitor intensifier.

* * * * *